April 20, 1954     C. B. LIVERS     2,675,829

QUICK-DISCONNECT COUPLING WITH SELECTIVELY OPERABLE VALVE

Filed June 22, 1951

INVENTOR.
C. B. LIVERS

BY *Ellwoodbury*

ATTORNEY

Patented Apr. 20, 1954

2,675,829

UNITED STATES PATENT OFFICE 2,675,829

QUICK-DISCONNECT COUPLING WITH SELECTIVELY OPERABLE VALVE

Carlos B. Livers, North Hollywood, Calif., assignor to Bendix Aviation Corporation, North Hollywood, Calif., a corporation of Delaware Application June 22, 1951, Serial No. 233,045

1 Claim. (Cl. 137—614)

This invention relates to couplings for hydraulic lines, such as hose connections, in which valves are provided for automatically sealing the ends of the lines and preventing leakage therefrom when the coupling is disconnected.

An object of the invention is to provide a simple and practicable coupling having check valves for sealing the lines automatically when the coupling is disconnected, in which the check valves can also be opened and closed while the coupling is connected, to control flow of fluid through the coupling.

Another object is to provide a coupling that can be easily connected and disconnected.

Other more specific objects and features of the invention will appear from the description to follow:

Briefly, the coupling in accordance with the invention comprises a pair of nipples and a connecting fitting. The nipples constitute the terminals of the two lines to be connected, and each nipple has an internal valve seat at its end and a check valve normally closing the seat. The connecting fitting receives the nipples in fluid sealing relation, locks them together with their ends in spaced juxtaposed relation, and contains a cam rotatable by an external handle for camming the check valves in the nipples apart to intercommunicate the nipples. The cam is separated from both nipples in response to disconnection of the coupling, so that even if the cam is in valve opening position, the valves are closed automatically prior to withdrawal of the nipples from the fitting.

In service, the connecting fitting may at all times remain connected to one nipple, and detachably retain the other by spring fingers that are moved into and out of locking engagement with the other nipple by sliding an external sleeve back or forward over the fingers. The sleeve can be so anchored that excessive tension in the line slides the sleeve to disengage the fingers and release the coupling.

A particular embodiment of the invention will now be described in detail with reference to the drawing in which.

Figure 1:
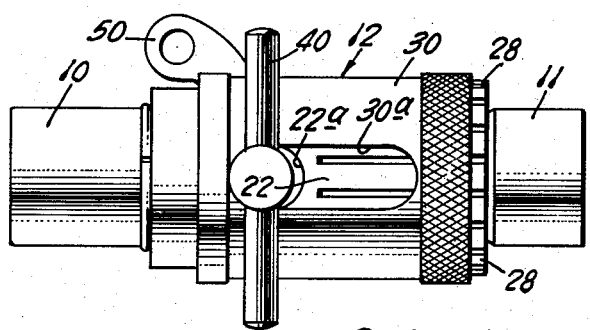
Fig. 1 is a side elevation of a coupling in accordance with the invention.
Figure 2:
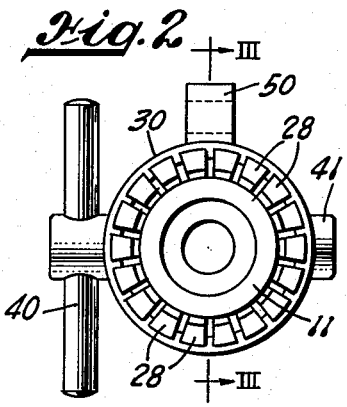
Fig. 2 is an end elevation looking at the right end of the coupling in Fig. 1.

As shown in Fig. 1, the coupling comprises a pair of nipples, 10 and 11, respectively, which are connected by a connecting fitting designated generally at 12. The nipple 10 is adapted to be connected to one end of one line, and the nipple 11 is adapted to be connected to one end of another line that is intended to be connected by the coupling to the first mentioned line. Thus referring to Fig. 3, each of the nipples 10 and 11 is provided with internal threads for connection to its associated line.

Each nipple 10 and 11 has a reduced inner end portion 13, terminating in an end wall 14, having an aperture therein which defines a seat for a poppet valve 15, which is positioned within the nipple. The poppet valve is urged against its seat by a compression spring 16, which is compressed between the poppet ball 15 and a spring retainer 17 which engages an internal groove in the nipple.

The reduced end portions 13 of the two nipples enter opposite ends of an inner sleeve 18, constituting a part of the connecting fitting 12. This inner sleeve 18 is dimensioned to snugly fit the reduced portions 13 of the nipples. The ends of the sleeve 18 are counterbored to define shoulders 19 which limit inward movement of the nipples into the sleeve 18, and sealing rings 20 are provided in internal grooves in the sleeve 18 for sealing with the outer surfaces of the reduced portions 13 of the nipples.

Figure 3:
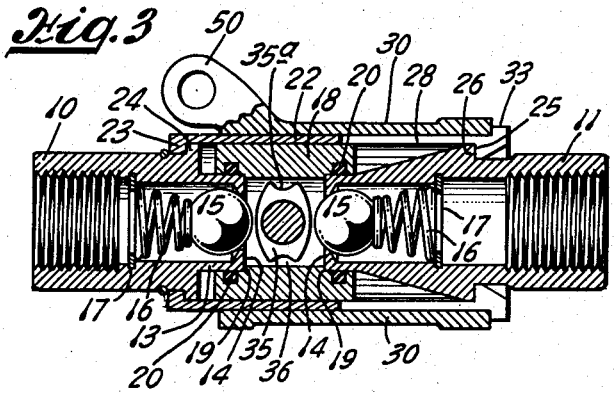
Fig. 3 is a longitudinal section in the plane III—III of Fig. 2, showing the coupling in connected relation and the check valves closed.
Figure 5:
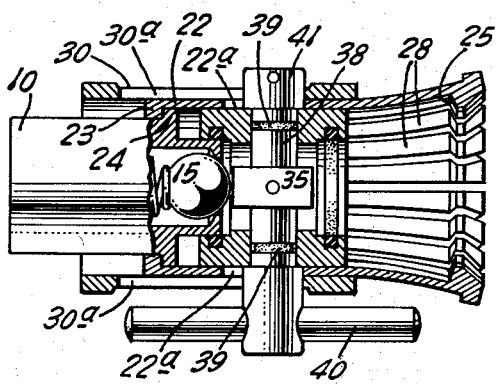
Fig. 5 is a plan view, partly in section, showing the coupling disconnected.
Figure 5:
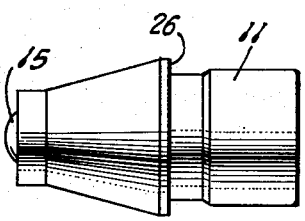

The nipples 10 and 11 are retained with their ends in abutment with the shoulders 19 in the sleeve 18, by a tubular member 22 which surrounds the inner sleeve 18 and extends substantially therebeyond at both ends. This tubular member 22 is provided with an internal shoulder 23 at one end for engaging an external shoulder 24 on the nipple 10 and is provided with an internal shoulder 25 at the other end for engaging an external shoulder 26 on the nipple 11. To permit release of the nipple 11 from engagement with the sleeve 18, the tubular member 22 is longitudinally slotted at its right end to produce a multiplicity of fingers 28 each of which bears a portion of the annular shoulder 25. These fingers 28 are of spring material and are preformed to normally deflect outwardly as shown in Fig. 5. However, when the coupling is connected as shown in Fig. 3, the fingers 28 are maintainted in contact with the shoulder 26 by an outer sleeve 30 which is slidable longitudinally on the exterior surface of the tubular member 22. Outwardly projecting shoulders 33 are provided on the tips of the fingers 28 for limiting movement of the outer sleeve 30.

Figure 4:
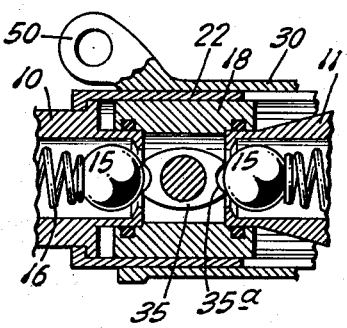
Fig. 4 is a partial section similar to Fig. 3 showing the check valves open.

As shown in Fig. 3, the coupling can be connected without opening the poppets 15 away from their seats, and hence without establishing communication through the coupling. However, the poppets 15 can be lifted off their seats after the coupling is made by rotating a cam 35 which is located in the chamber 36 defined by the inner sleeve 18. This cam is of general elongated shape, being of substantially greater dimension in one direction than in the other. When in the position shown in Fig. 3, the narrow dimension of the cam is presented to the poppets 15, and this dimension is sufficiently small to clear the poppets so that they are not lifted from their seats. However, by rotating the cam 35 one quarter turn into the position shown in Fig. 4, the long dimension of the cam is presented to the poppets to lift them clear of their seats and permit fluid flow through the coupling. The cam is preferably provided with recesses 35a in its ends for yieldably retaining the cam in valve opening position.

As best shown in Fig. 5, the cam 35 is secured to a cam shaft 38, which is journaled in bearing apertures provided therefor in the wall of the sleeve 18, the shaft 38 extending through the member 22 and beyond the outer surface of the outer sleeve 30. Sealing rings 39 may be provided in annular grooves on the shaft 38 to effect a fluid-tight fit between the shaft 38 and the sleeve 18. A handle 40 is secured to one end of the cam shaft 39 and a retaining collar 41 is secured to the other end thereof exterior of the inner sleeve 18.

Two relatively short, diametrically opposite slots 22a are provided in the tubular member 22 for the hub of the handle 40 and the collar 41 respectively, and relatively long diametrical slots 30a are provided in the outer sleeve 30 to permit passage of the hub 40 and the collar 41.

As shown in Figs. 1 and 3, when the coupling is connected, the shoulder 23 on the tubular member 22 engages the shoulder 24 on nipple 10, and the shoulder 25 on the other end of the tubular member 22 engages the shoulder 26 on the nipple 11 to retain those nipples against the shoulders 19 in the inner sleeve 18. At this time, the outer sleeve is moved to the right against the shoulder 33 in which position the hub of the handle 40 and the collar 41 are in the left ends of the slots 30a in the outer sleeve 30. These elements 40 and 41 are also in the left ends of the short slots 22a in the tubular member 22. Under these conditions, flow of fluid through the device can be controlled by rotating the handle 40 to turn the cam 35 either into the valve closing position shown in Fig. 3 or the valve opening position shown in Fig. 4.

To disconnect the coupling, the outer sleeve 30 is slid to the left sufficiently to clear the fingers 28 which thereupon spring outward, as shown in Fig. 5, to clear the shoulder 26 on the nipple 11. Thereupon the nipple 11 can be readily pulled out of the inner sleeve 18.

If the cam 35 was in the valve-closing position of Fig. 3 at the time of the disconnect operation, then no further operation was necessary to close the poppets 15 prior to complete disconnection of the coupling. In the event the cam 35 was in the valve-opening position shown in Fig. 4 at the time of the disconnection, the poppet valves will still be closed prior to removal of the nipple 11 from the sleeve 18. Thus as soon as expansion of the fingers 28 releases the shoulder 25 from the shoulder 26, nipple 11 is free to move outwardly with respect to the inner sleeve 18 and such outward movement is induced by the force of the spring 16 in the nipple 10. This spring tends to force its poppet 15 to the right, thereby applying a force to the cam 35. This force is applied through the cam shaft 38 to the inner sleeve 18, causing the latter to move to the right until the poppet 15 in the nipple 10 closes against its seat, thereby preventing further application of force by the poppet to the cam 35, at the same time preventing the movement of fluid past the seat 14. Such movement of the sleeve 18 relative to the nipple 10 and the tubular member 22 is permitted by the short slots 22a in the member 22 as shown in Fig. 5. After the poppet 15 in the nipple 10 is seated, continued movement of the nipple 11 to the right permits the poppet therein to seat, and the seating of both poppets occurs prior to movement of the reduced end portion 13 of the nipple 11 past the seal 20 in the sleeve 18.

In order to effect disconnection of the coupling, the outer sleeve 30 can be shifted manually. Thus, it can be grasped in one hand and the nipple 11 grasped in the other hand, and the sleeve pulled to the left (with reference to Fig. 1). In some instances, it is desirable to provide for automatic disconnection of the coupling in the event that undesired strain is put on the hose line or the like in which the coupling is inserted. Thus if the coupling is inserted in a hose line between two vehicles, such as a tractor and a towed implement, it is desirable that the coupling pull apart automatically should the main draw bar connection between the tractor and the implement be broken or be purposely disconnected. This automatic disconnect action can be provided by connecting a handle 50 on the outer sleeve 30 to the same vehicle that the hose connected to the nipple 10 extends. The connection may be made by a bracket, a rope, cable or wire which is substantially shorter than the hose connected to the nipple 10, so that the chain will tighten before the hose does, thereby providing the necessary tension between the sleeve 30 and the nipple 11 to pull the sleeve 30 into the releasing position shown in Fig. 5.

Although for the purpose of explaining the invention, a particular embodiment thereof has been shown and described, obvious modifications will occur to a person skilled in the art, and I do not desire to be limited to the exact details shown and described.

I claim:

In a coupling for fluid lines: a pair of nipples adapted to be attached to the ends of two fluid lines that are to be interconnected, each nipple having a fluid passage terminating in a valve seat, and a poppet valve in the passage in each nipple adapted to close against the seat therein and block fluid flow from the associated line; a sleeve for receiving said nipples with their ends in juxtaposed spaced relation and defining with said nipples a fluid-tight chamber intercommunicating the said passages in said nipples; means detachably securing said nipples in said sleeve; a cam mechanism in said sleeve comprising a cam in said chamber rotatable about an axis transverse to the axis of said sleeve and means extending exterior of the sleeve for rotating the cam, said cam having a first pair of diametrically opposed surfaces spaced apart less than the spacing between said poppets, and a second pair of diametrically opposed surfaces spaced apart greater than said spacing when said nipples are secured in said sleeve, whereby the poppets can be opened and closed by rotation of said cam between two positions; said means detachably securing said nipples in said sleeve comprising an annular shoulder on each nipple and a tubular member longer than and slideable on said sleeve and having inwardly extending shoulders at its ends for engaging said shoulders on said nipples and retaining such shoulders against separating movement, at least one end portion of said tubular member comprising a plurality of separate radially deflectable fingers whereby the shoulder at that end is movable radially into and out of engagement with the shoulder on the nipple at that end; and an outer sleeve slideable on said tubular member for retaining said shoulder at the fingered end of said member in engagement with the shoulder on the nipple at that end; said means for rotating said cam comprising a cam shaft extending through and sealing with bearing apertures provided therefor in said sleeve, and extending through longitudinal slots provided therefor in said tubular member and in said outer sleeve, said slot in said tubular member being only of sufficient extent to permit movement of said sleeve with respect to said member to seat the poppet remote from the fingered end of said member, and said slot in said outer sleeve being of sufficient extent to permit retraction of the outer sleeve from the fingered end of said tubular member.

References Cited in the file of this patent

UNITED STATES PATENTS

| Number | Name | Date |
|---|---|---|
| 747,493 | Scruggs | Dec. 22, 1903 |
| 1,156,049 | Bopp | Oct. 12, 1915 |
| 1,915,553 | Shindel | June 27, 1933 |
| 2,034,933 | Wilson | Mar. 24, 1936 |
| 2,108,714 | Hirsch et al. | Feb. 15, 1938 |
| 2,444,414 | Anderson et al. | July 6, 1948 |
| 2,485,763 | Moon | Oct. 25, 1949 |
| 2,625,410 | Crowley | Jan. 13, 1953 |